Oct. 12, 1965 B. J. WARMAN 3,211,836

AUTOMATIC TELECOMMUNICATION SWITCHING SYSTEMS

Filed July 26, 1962 5 Sheets-Sheet 2

Oct. 12, 1965 B. J. WARMAN 3,211,836

AUTOMATIC TELECOMMUNICATION SWITCHING SYSTEMS

Filed July 26, 1962 5 Sheets-Sheet 3

Oct. 12, 1965 B. J. WARMAN 3,211,836

AUTOMATIC TELECOMMUNICATION SWITCHING SYSTEMS

Filed July 26, 1962 5 Sheets-Sheet 4

Oct. 12, 1965 B. J. WARMAN 3,211,836

AUTOMATIC TELECOMMUNICATION SWITCHING SYSTEMS

Filed July 26, 1962 5 Sheets-Sheet 5

United States Patent Office 3,211,836

Patented Oct. 12, 1965

3,211,836

AUTOMATIC TELECOMMUNICATION SWITCHING SYSTEMS

Bloomfield James Warman, Charlton, London, England, assignor to Associated Electrical Industries Limited, London, England, a company of Great Britain Filed July 26, 1962, Ser. No. 212,524

Claims priority, application Great Britain, Aug. 1, 1961, 27,895/61

10 Claims. (Cl. 179—18)

Figure 1:
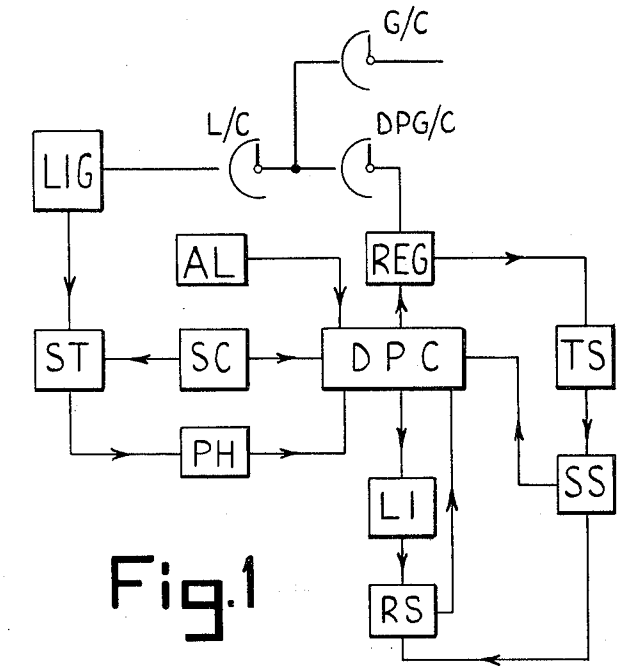

This invention relates to automatic telephone or other automatic telecommunication switching systems.

In an automatic telephone exchange employing line finders, the lines connected to the exchange, which lines may be subscribers' lines or incoming or outgoing junctions, are commonly divided into groups, hereinafter referred to as line-groups, having their respective lines multipled over the bank contacts of groups of line finders. Each of these line-groups may have associated with it a start circuit, or such start circuit may serve a number of sub-groups (e.g. two) divided out of a line-group. Upon the appearance of a start signal in one of the start circuits, signifying that one or more of the lines of the line-group or sub-group, as the case may be served by the start circuit is in a calling condition, control equipment may initiate a searching operation by one of the line finders serving the calling line-group or sub-group to search for and set itself to the calling line. This setting of the line finder to the calling line can serve for coupling up the calling line circuit to register equipment over a dial path circuit, but it can also serve for identifying the calling line's number to the register equipment (i.e. calling line identification). Such is the case with the automatic telephone exchange particularly described in U.S. application Serial No. 122,137, filed July 6, 1961, in which a start circuit serving a sub-group responds to a calling condition on one of the lines in the sub group to generate a start signal which is fed into a dial path control circuit which thereupon drives a dial path allotter switch to search for a free dial path circuit which can serve the calling line. Under the control of the allotted dial path circuit a register hunter then searches for a free register and subsequently, when such register has been coupled to the dial path circuit, a line finder (line hunter) is caused to search for the calling line. The identity of the calling line is indicated to the register over the register hunter, the first two digits of the calling line's identity being obtained from fixed strappings which by identifying the dial path circuit taken into use also identify the particular line-group of the calling line, while the last two digits of the calling line's identity can be obtained either from the final setting of the line finder or by counting impulses reverted to the register taken into use as the line finder searches for the calling line. Having coupled the calling line to the register, the calling subscriber can dial into the register over the allotted dial path circuit. These line finders (line hunters), however which may be taken into use to search for and set themselves on calling lines, are never utilised for actually setting up conversational paths through the exchange between calling and called lines. Moreover, the dial path circuits for coupling calling lines to registers may have access to only a limited number of registers in consequence of which a significant proportion of the dial path circuits cannot be utilised under peak traffic conditions, thereby representing a material loss of valuable switching equipment. Typically, the allocation of the dial path circuits may be of the order of six dial path circuits for each two hundred lines; consequently a ten thousand line exchange would require three hundred dial path circuits, but these dial path circuits may have access to only sixty registers. This relatively high allocation of dial path circuits to the lines served by the exchange, however, tends to worsen the situation under exchange congestion conditions (i.e. when there is a shortage of conversational paths through the exchange) inasmuch as the dial path circuits may couple up calling lines to free registers which subsequently attempt to set up calls in accordance with the information received by them notwithstanding the shortage of conversational paths. Consequently, calling subscribers may dial repeatedly into registers in an attempt to establish their calls. The dial path circuits include line hunters having exchange lines multipled over their banks: thus a further exchange multiple, that is, an exchange multiple in addition to that connecting the exchange lines to the banks of primary switches (line connectors), will be needed, representing a considerable installation cost, for connecting line hunters to the lines via the intermediate distribution frame of the exchange.

The present invention has in view improved control circuit arrangements in an automatic telecommunication, for example telephone, switching system for coupling register equipment to calling lines connected to the exchange which provide various economies as regards equipment and/or the better utilisation of such equipment and which at the same time utilise the principle of exchange sectionalisation according to U.S. application Serial No. 122,137. By the sectionalisation of the exchange, switching equipment which permits the selective establishment of communication paths between lines connected to the exchange can be better utilised so that economies in such equipment can be achieved for a given grade of service, or such grade of service can be improved, such sectionalisation enabling direct choice of route, based not only on the called subscriber's number, but also on the calling subscriber's number allowing direct choice throughout the exchange, and the traffic through the exchange to be largely balanced over the various exchange sections. Briefly, this traffic balance is realised by transmitting the identities of the calling and called lines for a particular call to be set up to route choice equipment whereupon a route for the call may be chosen through a particular section of the exchange on the basis of the traffic conditions existing in these sections at that time.

Although the foregoing introduction has been restricted to a switching system employing line finders, it should be understood that the present invention is not restricted to such systems. For instance, the present invention may be applied to systems in which a call between calling and called lines connected to the exchange may be established over a physical path completed through crossbar switches or through electronic or electromagnetic switching devices serving an analogous function, or the call may be set up over a time channel on a time division multiplex (TDM) basis.

The various forms of switch that may be employed for setting up calls through the exchange and connected to the lines of the exchange will, for convenience, hereinafter be called line connectors which have access to or from what will be called group connectors affording selective connection to the line connectors. These line connectors correspond for instance to line finders and final selectors in a line finder system or to primary switches in a crossbar system or time division multiplex (TDM) system, while the group connectors correspond to second finders or group selectors in a line finder system or to secondary switches, if provided, in a crossbar or time division multiplex (TDM) system.

According to the present invention there is provided in an automatic telecommunications exchange in which switching equipment which permits the selective establishment of communication paths between lines connected to the exchange is provided in a plurality of sections which together afford between any two of said lines, through the switching equipment, a plurality of possible communication paths of which the incoming portions are respectively afforded by various ones of said sections and the outgoing portions are likewise afforded by various ones of the sections, in which there is a section selecting arrangement which in respect of a call between two lines and on the basis of information fed to it as to pertinent conditions relative to the several sections, is operable to cause the establishment of a connection between said two lines over such one of the possible paths as will give best advantage having regard to said conditions, and in which groups of line connectors are afforded access to or from associated groups of group connectors, control circuit arrangements effective for causing a calling line of a line-group or sub-group served by a line connector group to be coupled to register equipment through a line connector of the line connector group and through a group connector having access to or from the line connector, and thereafter causing a communication path between the calling and called lines to be established through a group connector different from that through which the calling line was initially coupled to the register equipment. The line connector through which the calling line was coupled up to the register equipment may, if desired, also be different from that through which the call is subsequently established in accordance with the identities of the calling and called lines' numbers.

It will be appreciated that such control arrangements according to the present invention are ideally suited for switching arrangements employing sectionalisation of the switching equipment by reason of the fact that the line connector initially taken into use for establishing a connection between a calling line and register equipment may not correspond to that through which the call is to be routed through the exchange on the basis of a route choice made by route choice selecting equipment in dependence upon the traffic conditions existing in the various exchange sections. The registers may be divided into groups corresponding to the exchange sections and the choice of register and route may be made by the same route choice selecting equipment after consideration of the traffic conditions in the register groups and corresponding exchange sections.

The present invention, by the utilisation of line connectors (i.e. switches which may be capable of setting up conversational paths) for coupling calling lines to register equipment rather than by providing discrete selective switching means (e.g. line hunters and register hunters) for this purpose, enables economies to be achieved both as regards the quantity of switching equipment and the number of exchange multiples and, if desired, the saving in switching equipment may advantageously be invested in larger line connector groups to improve the grade of service afforded the lines served by these groups.

For the purpose of obtaining the identity of a calling line, it may be arranged that the line connector group capable of dealing with the call is first ascertained by searching over a group of start circuits conveniently allocated on the basis of two start circuits per line-group to find the calling start circuit serving the calling line. The location of this start circuit serves for identifying the calling line-group (i.e. thousands and hundreds digit values of calling line's number) and thus a free line connector of the line connector group serving the calling line-group can subsequently be caused to search over its outlets for the calling line, while impulses may conveniently be reverted by the searching line connector to register equipment for the purpose of identifying the tens and units digit values of the calling line's number.

As will hereinafter be apparent, line groups may advantageously be divided into sub-groups comprising so-called P-lines and Q-lines, respectively, and consequently the location of the calling start circuit can also serve for determining whether the calling line is a P-line or a Q-line.

Calling line identification may alternatively be obtained by electronic scanning of all the lines connected to the exchange in which case a free line connector may be taken into use and driven to the outlet to which the calling line is connected in correspondence with the stopping position of the electronic scanner.

The advantages which can be obtained from sectionalisation of the exchange may also be achieved with control arrangements according to the invention by the sectionalisation of the register equipment with the exchange equipment and thereby enabling incoming traffic to be balanced over the register groups pertaining to the respective exchange sections.

The present invention as applied to an automatic telephone exchange employing motor uniselectors and utilising the principle of exchange sectionalisation forming the basis of U.S. application Serial No. 122,137 will hereinafter be described by way of example with reference to the accompanying drawings, in which:

FIG. 1 is a block schematic diagram of parts of the exchange embodying the invention; and FIGS. 2 to 8 are detailed circuit diagrams of some of the parts of the exchange represented in block form in FIG. 1.

Before referring to the drawings, it may here be stated that the switching equipment of the exchange is divided into a number of sections and each of these sections is divided into a number of units. Each unit comprises a number of line connectors having access to and from group connectors individual to the unit, while the line connectors of each unit in each of the exchange sections are divided into groups each consisting of a number of line connectors. Corresponding outlets of the line connectors of a group in an exchange section are multipled together and to corresponding multipled outlets in corresponding line connector groups in each of the other exchange sections, but not necessarily in the corresponding unit in such other exchange section.

Considering one of these exchange sections, each group of multipled line connectors in each unit serves a particular group of lines (e.g. one line-group consisting of 100 lines) these lines being multipled over the several sections according to the multipling of the line connector outlets. In U.S. application Serial No. 122,137, it was assumed for the purpose of giving some indication of the switching quantities required, that each line-group consisted of 100 lines and that the estimated traffic called for a total of 20 line connectors having common access to these lines. Thus, if the exchange comprises 4 sections then the number of line connectors in each group in each unit would be 20/4=5. Also assuming that the group connectors are 100-outlet switches so that each of these could give access to 100 line connectors, then the number of groups of line connectors per unit would be 100/5=20. Consequently, if the line connectors are also 100-outlet switches then each line connector group could serve 100 lines giving a total of 100×20=2,000 lines per unit and thus a 10,000 line exchange would consist of 5 units in each of its 4 sections.

The multipling of the line-groups over the sections of the exchange is effected by multipling the outlets of each line connector group in each unit of any section to corresponding outlets of corresponding line connector groups in the other sections but not necessarily in the corresponding units in these other sections. The lines of each line-group are divided into two sub-groups consisting of P-lines and Q-lines, respectively. The line connector outlet multiples to which the P-lines are connected extend over corresponding line connector groups in corresponding units in the exchange sections but the line connector outlet multiples to which the Q-lines are connected are multipled over corresponding line connector groups in different units in the exchange sections. This slipping of the Q-line section of the multiple between units of the exchange sections means that for a call between the P-lines of a line-group the same two units will be involved in each section, whichever section may be selected to establish the call, whereas for calls between two Q-lines or between a P-line and Q-line the two units involved may be different depending on the particular section selected. The effect of this is to give a balance of the traffic not only over the exchange sections but also over the several units of the sections, even though the section selector only chooses between the routes offered by the various sections.

In applying the present invention to such sectionalised exchange both line connectors and associated group connectors are utilised for coupling calling lines to registers and these registers may advantageously be divided into groups, each group being individual to an exchange section, whereby incoming traffic to the exchange (i.e., dialling traffic) can be balanced over the register groups in order to provide greater simulated availability of the registers to calling lines.

Referring now to FIG. 1 of the drawings, those parts of the exchange which have been shown for the purpose of describing the invention include a line-group LIG consisting of 100 lines connected to the exchange. The lines of this line-group are conveniently divided into two sub-groups comprising P-lines and Q-lines, respectively, and these lines are connected to the respective outlets of a 100-outlet motor uniselector line connector L/C being one of a group of such line connectors pertaining to one of four exchange sections and serving the line-group LIG. As previously indicated, the multipled outlets of this line connector groups serving P-lines will be multipled over corresponding multipled outlets of corresponding line connector groups in corresponding units in the other exchange sections, but in the case of those multipled outlets of the line connector group serving Q-lines the multiple is slipped from one unit to another at the point of connection between the several exchange sections.

Each of the lines of the line-group LIG has a start lead associated with it to which a calling potential (i.e. negative signal) is applied in response to the looping of the line. The start leads are divided into two groups each consisting of 50 leads corresponding to the sub-grouping of the line-group LIG into P- and Q-lines respectively, that is, the start leads associated with the P-lines constitute one group while those associated with the Q-lines constitute the other group of start leads. Each of these groups of start leads is connected in common to a start circuit of a start circuit group ST. It will be appreciated therefore that each start circuit of the start circuit group ST serves a total of 50 lines. Consequently, assuming that each exchange unit of switching equipment serves 2,000 lines, 40 start circuits per exchange unit will be provided, and for a 10,000 line exchange (5 units per exchange section) a total of 200 start circuits arranged in groups of 40 will be required. Each of these groups of start circuits, such as ST, has associated with it an electronic scanner, such as represented by the block SC in FIG. 1, which continuously scans the start circuits of the appertaining group in turn in order to locate calling start circuits. The scanning action of the scanner SC is so arranged that just prior to the scanning of the next start circuit in the scanning sequence, it extends a marking corresponding to this start circuit to a group of dial path control circuits, common to the start circuit group, to give these circuits the opportunity to recognise if they have already been selected to deal with a start signal from this start circuit. This prevents more than one dial path control circuit responding to successive start signals which the start circuit may initiate during the period between the first start signal and the setting of a line connector to the calling line and the subsequent removal of the calling condition. Shortly after extending this marking in common to the group of dial path control circuits, one of which is shown at DPC, the start circuit to which the marking corresponds is scanned by the electronic scanner SC. If this start circuit being scanned is in the calling condition, and it has not already been attended to, then a pulse is fed to a start signal inhibit circuit PH which is common to all the start circuits of the group ST as well as being common to all the dial path control circuits, such as circuit DPC, serving the start circuit group. The pulse applied to the circuit PH causes a pulse to be extended from the circuit PH to all of the dial path control circuits, but only one of these dial path control circuits which has previously been selected by a dial path circuit allotter AL to deal with the next call will respond to such pulse for gating the marking extending to it from the start circuit scanner SC and identifying the calling start circuit into storage elements of the dial path control circuit DPC. As the allotted dial path control circuit is taken into use, it applies a pulse inhibiting signal to the start signal inhibit circuit and should further start signals from the same start circuit be applied to the pulse highway before a dial path has been established the inhibiting signal from this dial path control circuit will prevent any such subsequent start signal passing to another dial path control circuit in the group. The allotted dial path control circuit sends a busy marking to the allotter AL. Had the particular start circuit being scanned by the electronic scanner SC not been in calling condition, the marking corresponding to this start circuit, although being extended to the inputs of the dial path control circuits, would not have been gated into storage elements of one of the latter selected by the dial path allotter in the absence of a pulse from the start signal inhibit circuit PH.

The possibility exists that a calling start circuit may already have been attended to and the marking identifying the calling start circuit will have been already stored in a dial path control circuit of the relevant group. To cater for such an eventuality, the dial path control circuits each comprise comparator elements which are associated respectively with the previously-mentioned storage elements and which enable a comparison to be made between the start circuit identifying marking extended to the dial path control circuits from the electronic scanner SC and any marking already stored in a dial path control circuit of the group, whereby a pulse-inhibiting signal can be applied to the inhibit circuit PH if the markings correspond to prevent another dial path control circuit from being taken into use consequent upon the scanning of the calling start circuit by the electronic scanner SC.

Each of the dial path control circuits, such as DPC, is capable of being coupled to and of extending a stored marking to a line location identifier LI common to all the exchange sections. The dial path control circuits, such as circuit DPC, are sequentially accorded the chance of being coupled to the line location identifier LI, which may be substantially the same as the line location identifier described in U.S. application Serial No. 122,137, under the control of a scanner which can serve to scan not only the dial path control circuits, but also the registers as will hereinafter be described. Thus, a dial path control circuit once it has stored in it a marking corresponding to a calling start circuit will allow itself to be coupled to the line identifier LI when next given the opportunity to do so under the control of the dial path control circuit/register scanner.

As already explained, each start circuit group, such as ST, comprising 40 start circuits serves 2,000 lines (i.e. one exchange unit) and these start circuits are served in common by a group of dial path control circuits. Thus, by storing the identity of a calling start circuit in a dial path control circuit, it is possible for the dial path control circuit to identify to the line location identifier LI the thousands and hundreds digit values of the calling line's number. For instance, if the group of dial path control circuits under consideration serve a start circuit group, such as group ST, pertaining to lines having for example numbers 0000 to 1999, then one sub-group of 20 start circuits will pertain to lines having the thousands digit 0, whilst the other sub-group of 20 start circuits will pertain to lines having the thousands digit value 1. Consequently, since the dial path control circuit group serves a particular exchange unit (i.e. lines 0000 to 1999) then the presence or absence of a marking element in a marking extended to the dial path control circuits of the group from the start circuit scanner SC to identify a calling start circuit can indicate to the dial path control circuit which of the two sub-groups of 20 start circuits contains the calling start circuit. Thus, by the provision in the dial path control circuits of fixed strappings corresponding to the two specific thousands digit values of lines served by the dial path control circuit group (i.e. 0 and 1) a marking can be extended to the line location identifier LI over these strappings and a further lead which is marked or unmarked according to which of the two sub-groups of start circuits contains the calling start circuit, which marking identifies the thousands digit value of the calling line. The hundreds digit value of the calling line's number can also be identified to the line location identifier LI from the dial path control circuit storing the identity of the calling start circuit by extending to it a marking representing the pattern to which a proportion of the storage elements in the dial path control circuit have been set by the marking extended to the dial path control circuit from the start circuit scanner SC. Since these markings extended to the line location identifier LI identify the thousands and hundreds digit values respectively of the calling line's number, the line location identifier can identify the line connector group which serves a further marking from the dial path control circuit the calling line and, moreover, it has indicated to it by whether the calling line is a P-line or a Q-line.

It will be remembered that the line location identifier LI can be coupled up to a dial path control circuit or a register. When the line location identifier LI is coupled up to a register, however, it receives the identities of both the calling and called lines' numbers as represented by binary markings on respective groups of leads, whereas when the line location identifier is coupled up to a dial path control circuit only information for partly identifying the calling line's number is fed to it. Consequently, the group of input leads in the line location identifier to which the marking representing the called line's number would be applied when coupled up to a register may be strapped to accept a particular combination (e.g. 0000) when the identifier LI is coupled to a dial path control circuit so as to indicate that a register and not a route between calling and called lines is required.

The busy or free conditions of registers, such as register REG, in register groups individual to the respective exchange sections are indicated to a register traffic summator TS common to all the exchange sections. The line location identifier LI passes the information it receives from the dial path control circuit concerning the identity of the calling line to register route selectors, such as RS, pertaining to the respective exchange sections each of which determines the identity of the line connector group and the unit to which the calling line is connected in its section and chooses a particular free line connector in this line connector group in accordance with information fed to it as to the busy or free condition of the line connectors of the relevant group. The register traffic summator TS passe information concerning the register traffic levels in the respective sections to a section selector SS which accordingly selects the section and hence the register group which is carrying the least dialling traffic. A marking is then fed back to the dial path control circuit for identifying the register group that is to be used while further markings are fed into the dial path control circuit from the register route selector pertaining to the selected section identifying the line connector group and the particular line connector selected for dealing with the call. These markings are recorded by storage elements in the dial path control circuit which may be provided with a coupler switch for searching for a free register in the particular register group selected by the section selector SS. Having found a free register, such as register REG, a dial path motor uniselector group connector, such as DPG/C, permanently coupled to the register, is set into operation and is driven until it reaches the line connector group, the identity of which was recorded in the dial path control circuit, and thereafter the dial path group connector is driven further until it reaches the particular line connector, the identity of which was also recorded in the dial path control circuit. The selected line connector, such as line connector L/C, is then caused to search over its banks for the calling line with impulses being reverted from the line connector to the register coupled to it for the purpose of identifying to the register the tens and units digit values of the calling line's number. Upon finding the calling line, the drive circuit for the line connector is interrupted and the register taken into use by the dial path control circuit is coupled up to the calling line via the line connector, such as L/C, and the dial path group connector, such as DPG/C, while the dial path control circuit can then be released for handling a further call. The calling potential applied to the start lead of the calling line circuit is shunted by earth potential applied to this start lead through the line connector, such as L/C, ad the usual line relay of the calling line will subsequently be operated to remove the calling potential. The register, such as REG, returns dial tone to the calling line and the calling subscriber can then dial into the register through the set line connector L/C and dial path group connector DPG/C.

The particular line connector which is caused to search for the calling line may not test into that calling line which initiated the above-described sequence of operations, or it may test into another calling line in the same line-group instead of the calling line for which the line connector is searching. In either event the dial path control circuit will release consequent upon the line connector failing to test into a calling line or testing into a calling line other than that for which it is searching but the calling potential applied to the start lead of the calling line will still be present and consequently another dial path control circuit will be taken into use for dealing with the call.

Assuming, however, that the line connector tests into the calling line for which it is searching then the register has had indicated to it the complete identity of the calling line, since it knows the identity of the line connector to which the calling line is connected as well as the tens and units digit values of the calling line. It then receives dialled impulses from the calling line for identifying the called line's number.

Markings representing the calling and called lines' numbers can then be extended to the line location identifier LI when the register next has a chance to be coupled to the line identifier. The establishment of the call through the exchange may then proceed in the same manner as fully described in U.S. application Serial No. 122,137, with the route through the exchange being chosen in accordance with and in dependence upon the traffic conditions existing in the several exchange sections.

With the particular arrangement shown schemically in FIG. 1 as so far described, the line connector L/C has access to or from the dial path group connector DPG/C so that the call between the calling and called lines must of necessity be subsequently established through different line and group connectors. All of the line connectors, such as L/C in FIG. 1, have access to or from group connectors, such as G/C, capable of extending a calling line through to transmission bridge links as well as having access to or from dial path group connectors, such as DPG/C. This arrangement has the advantage that all of the line connectors are available for coupling calling lines to registers or for setting up calls through the exchange.

Figure 6:
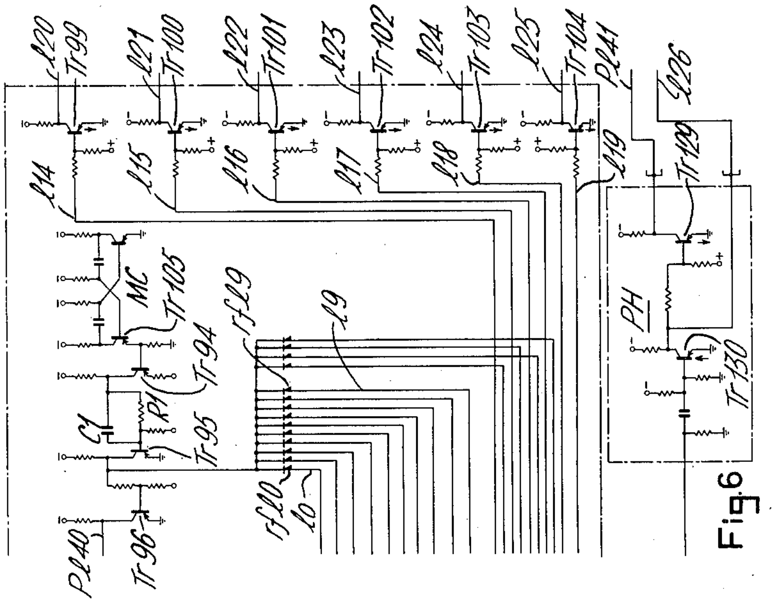
Figure 3:
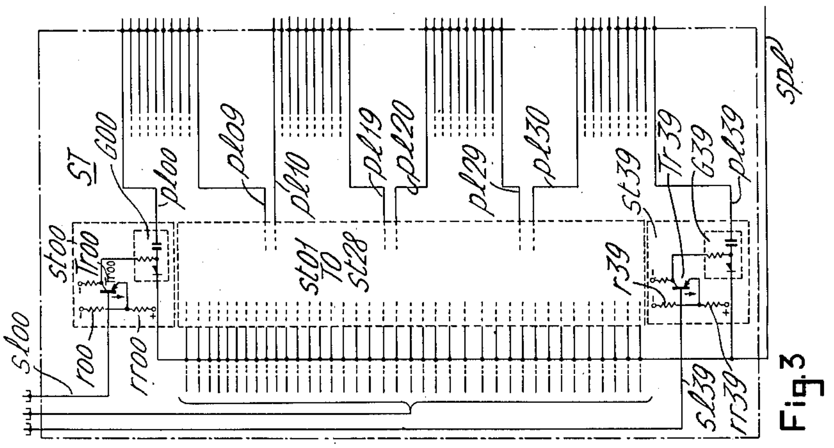
Figure 8:
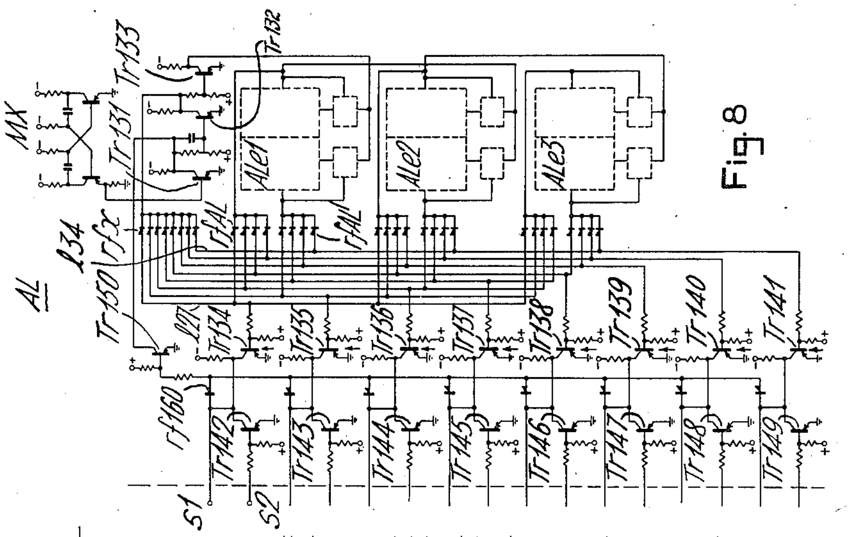
Figure 4:
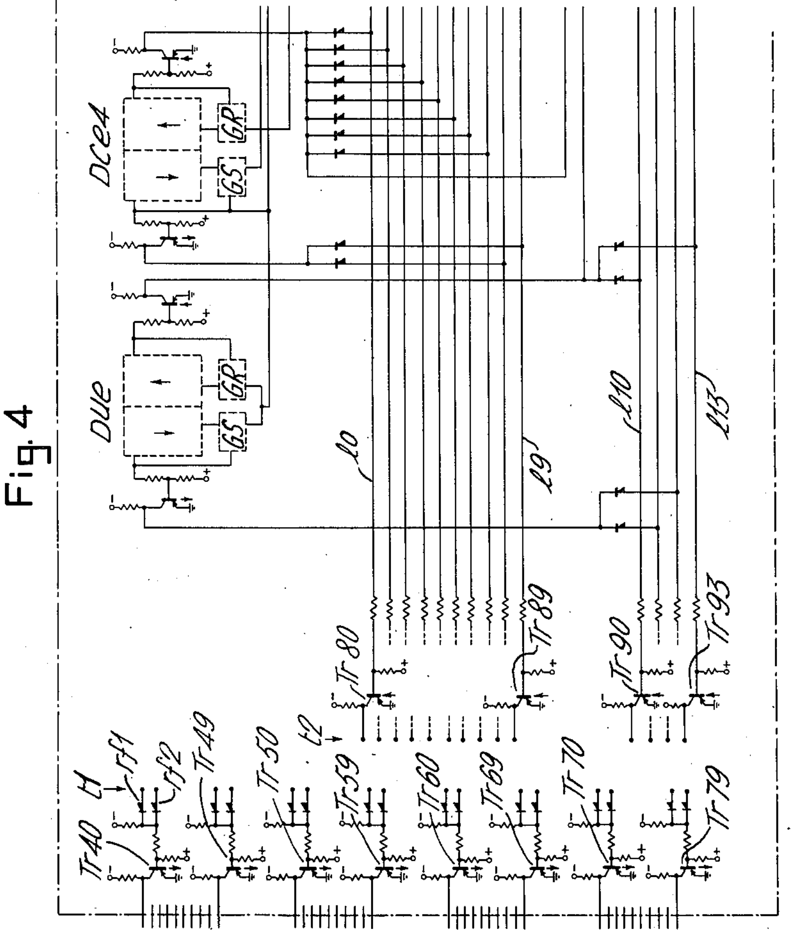
Figure 5:
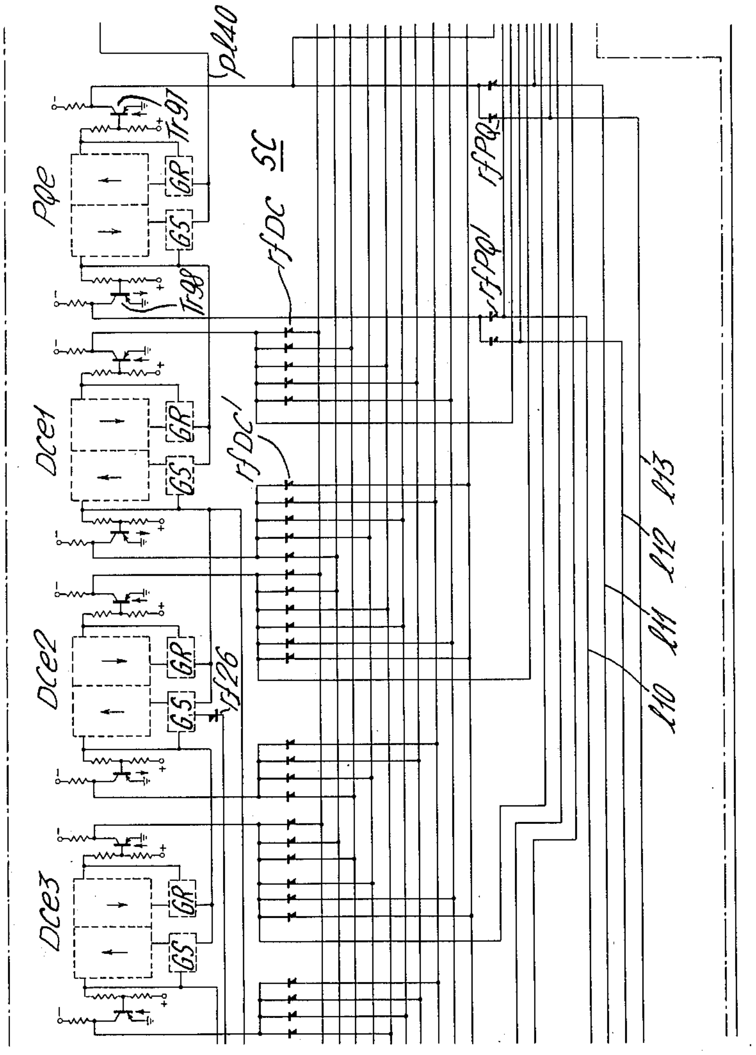
Figure 7:
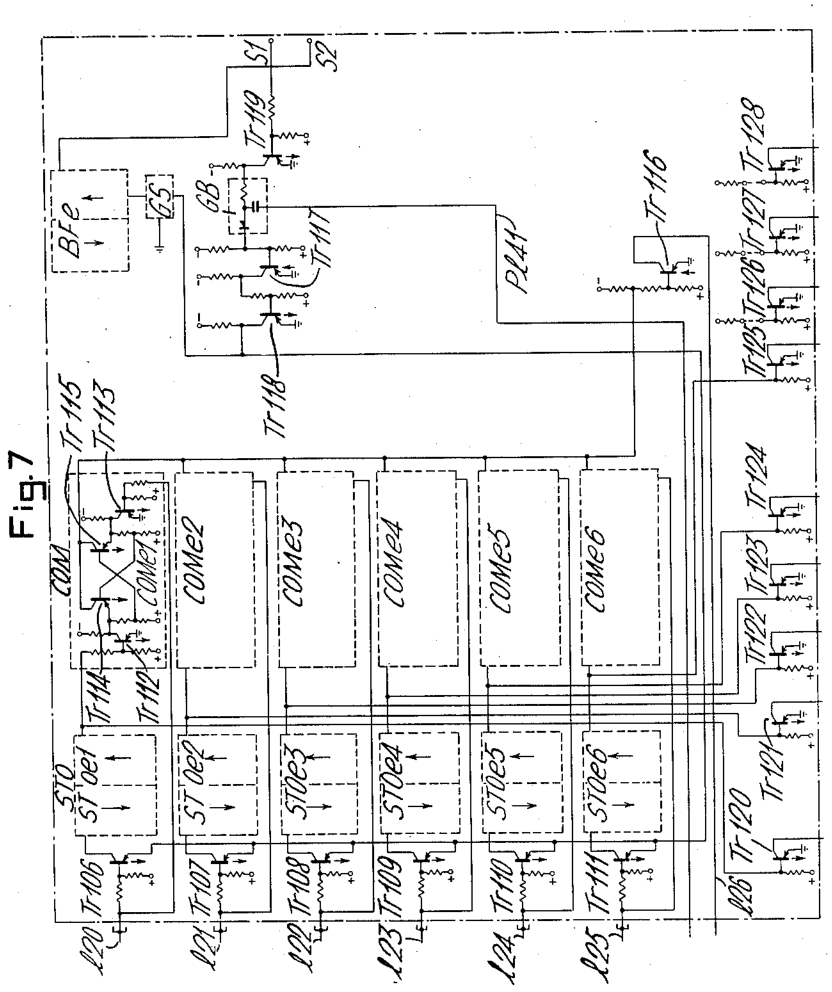

Reference will now be made to the detailed circuit diagrams shown in FIGS. 2 to 8 of the drawings. Of these diagrams, FIGS. 3 to 8 are intended to be arranged side-by-side in numerical sequence from left to right in order to form a composite circuit diagram. FIG. 3 shows a start circuit group consisting of 40 start circuits serving an exchange unit of 2,000 lines or 20 line groups; FIGS. 4 to 6 together show a circuit diagram of an electronic scanner serving the start circuit group shown in FIG. 1 with FIG. 6 also including a pulse highway; FIG. 7 shows a circuit diagram of part of a dial path control circuit; and FIG. 8 shows a circuit diagram of an electronic dial path control circuit allotter.

The electronic start circuit scanner (FIGS. 4 to 6), the dial path control circuit as represented in part in FIG. 7 and the electronic dial path control circuit allotter (FIG. 8) each include bistable transistor circuits, such as represented by the dotted line block PQ*e* in FIG. 5. These bistable transistor circuits, all of which bear the suffix *e*, are exemplified by the circuit shown in FIG. 2 to which reference will now be made in order to consider the detailed operation of the bistable circuit prior to the description of the overall circuit operation.

Figure 2:
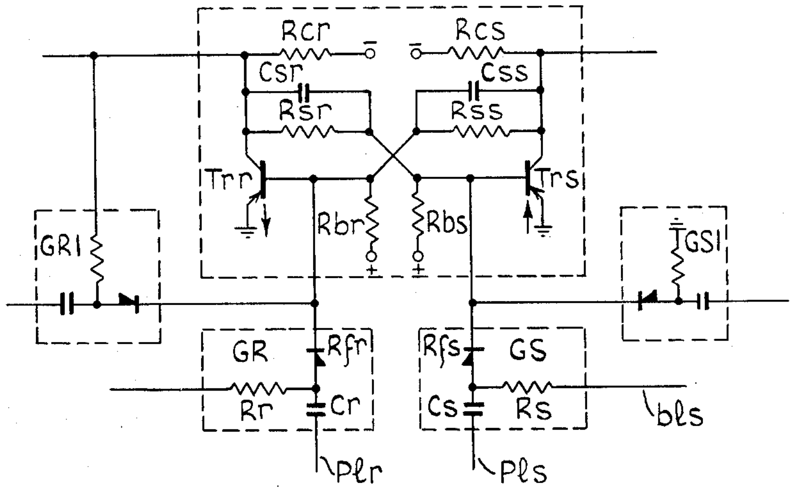

Referring then to FIG. 2 of the drawings, two transistors T*rr* and T*rs* have their respective collectors and bases cross-coupled through capacitors C*sr* and C*ss* in parallel with resistors R*sr* and R*ss*. The collectors of the transistors T*rr* and T*rs* are also connected through respective collector resistors R*cr* and R*cs* to negative supply terminals (—) while their bases are also connected through respective bias resistors R*br* and R*bs* to positive reference potential terminals (+). The emitters of the two transistors are connected directly to earth potential. With the left-hand transistor T*rr* for example in a substantially nonconducting state (this being indicated by the downward pointing arrow adjacent this transistor) its resulting negative collector potential bias the base of the right-hand transistor T*rs* negative through the parallel combination of the capacitor C*sr* and resistor R*sr* so that this latter transistor is fully conducting (this being indicated by the upward pointing arrow adjacent this transistor). A positive signal applied to the base of the right-hand transistor T*rs* raises the base potential of this transistor, thereby tending to reduce its conduction. The consequent negative-going change of potential on the collector of the right-hand transistor T*rs* is transferred via the parallel combination of capacitor C*ss* and resistor R*ss* to bias the base of the left-hand transistor T*rr* negative, thereby tending to render this transistor conducting with a consequent rise in its collector potential which is transferred via the parallel combination of capacitor C*sr* and resistor R*sr* to bias the base of the right-hand transistor T*rs* more positive and thereby tend to further reduce the conduction of this latter transistor. This regenerative action continues until the left-hand transistor T*rr* becomes fully conducting and the right-hand transistor T*rs* substantially non-conducting. Upon the application of a further positive signal to the base of the left-hand transistor T*rr*, a similar operation to that just above described will take place in reverse, resulting in the right-hand transistor T*rs* becoming fully conducting again and the left-hand transistor T*rr* becoming substantially non-conducting. It is evident that a positive signal applied to the base of the non-conducting transistor in the bistable circuit is ineffective in changing the conducting states of the two transistors.

Hereinafter, the normal state of a bistable circuit as indicated by the arrows adjacent its transistors will be called the reset state, while its operated state, in which the state of conduction of the transistors is reversed, will be called the set state.

Associated with the bistable circuit in FIG. 2 is an individual so-called pulse-pulse-bias setting input gate GS which comprises a pulse input capacitor C*s*, a bias input resistor R*s* and an output rectifier R*fs* all connected to a common point within the gate. Externally of the gate GS, capacitor C*s* is connected to a pulse lead *pls*, the resistor R*s* is connected to a bias lead *bls* and the output rectifier R*fs* is connected to and is poled to conduct towards the base of the right-hand transistor T*rs*. With these connections the gate is closed by applying a suitable negative potential to the bias leads *bls* to back off the rectifier *rfs* sufficiently to prevent it passing positive pulses applied to pulse leads *pls*, and is opened by replacing the negative potential on *bls* by a more positive (earth) potential to forward bias the rectifier *rfs* so that it passes positive pulses applied over lead *pls*. An individual pulse-plus-bias resetting gate GR is also associated with the bistable circuit. This gate similarly comprise a pulse input capacitor C*r*, a bias input resistor R*r* and an output rectifier R*fr* and operates in the same fashion as the gate GS in response to a positive signal applied to capacitor C*r* over a pulse lead *plr* and with a bias lead *blr* held at a suitable potential, but in respect of the resetting of bistable circuit.

With regard to the bistable transistor circuits included in the circuits of FIGS. 4 to 8, it is to be noted that the gates (setting and/or resetting) of some of them have their bias resistors connected directly to earth in the manner shown in a further setting gate GS1 in FIG. 2: this means of course that such gates are permanently open. Other gates (setting and/or resetting) may be biased from their associated bistable circuit by connecting their bias resistor to the collector of one of the transistors in the circuit in the manner shown in a further resetting gate GR1 in FIG. 2.

Having described in detail the operation of the transistor bistable circuits, such as PQ*e* in FIG. 5, reference will now be made to FIG. 3 of the drawings which illustrates a start circuit group ST. The start circuit group ST illustrated comprises 40 start circuits *st*00 to *st*39. These start circuits, such as start circuit *st*00, each consist of a transistor, such as transistor T*r*00, having its base connected to a start lead, such as start lead *sl*00, common to the start wires (not shown) of line circuits associated with 50 lines. Thus the 40 start circuits are capable of serving two thousand lines (i.e. one exchange unit) in all. As hereinbefore indicated, each line-group is advantageously divided into two sub-groups: one sub-group consisting of P-lines and the other sub-group consisting of Q-lines. Hence, for the purpose of determining whether a calling line is a P-line or a Q-line, as will be fully explained later, the sub-groups of P-lines may conveniently be served by the even-numbered start circuits while the sub-groups of Q-lines may conveniently be served by the odd-numbered start circuits. Thus, start circuit *st*00 for example, may serve the P-line sub-group of one line-group while start circuit *st*01 serves the Q-line sub-group of the same line-group.

It will be seen that the emitters of the start circuit transistors, such as transistor T*r*00, are connected to the tapping point on a potential divider circuit consisting of a pair of resistors, such as resistors *r*00 and *rr*00, connected respectively to negative and positive potentials. The collectors of these transistors, such as transistor T*r*00, are connected to the bias inputs of pulse-plus-bias gates, such as gate G00, corresponding to the gate GR hereinbefore described with reference to FIG. 2 of the drawings. The pulse outputs of these pulse-plus-bias gates are connected in common to a start pulse lead *spl* extending to a pulse highway PH to be described later with reference to FIG. 6 of the drawings. The pulse inputs of the start circuit gates, such as gate G00 of the start circuit *st*00, are connected over pulse leads *pl*00 to *pl*39 to the collectors of respective output transistors of a start circuit electronic scanner SC (FIGS. 4 to 6) serving the start circuit group ST. However, before describing the start circuit scanner SC in detail, it may here be mentioned by referring for example to the start circuit *st*00 that the transistor T*r*00 is non-conducting in the absence of calling potential on the associated start lead *sl*00. However, upon the initiation of a call on one or more of the 50 P-lines served by the start circuit *st*00 negative calling potential is applied to the start lead *sl*00 from the calling line circuit or circuits via rectifiers (not shown) which renders transistor T*r*00 conducting, which in turn applies positive potential to the bias input of the pulse-plus-bias gate G00 to permit of the transmission through this gate to the pulse highway PH (FIG. 6) over start pulse lead *spl* when a positive pulse is applied to the pulse input of the gate. The operation of the start circuits *st*01 to *st*39 corresponds to that of start circuit *st*00 just above described.

Referring now to FIGS. 4 to 6 of the drawings, there is shown an electronic scanner SC which continuously scans the 40 start circuits *st*00 to *st*39 of the start circuit group ST in turn by feeding positive pulses over the pulse leads *pl*00 to *pl*39. These pulse leads *pl*00 to *pl*39 are connected respectively to the collectors of 40 output transistors T*r*40 to T*r*79 only some of which have been shown so as not to overburden the figure. These transistors, such as transistor T*r*40, are normally held non-conducting by positive potentials applied to their bases through one or other or both of a pair of rectifiers, such as rectifiers *rf*1 to *rf*2 associated with transistor T*r*40. However, during scanning as will hereinafter be described, the transistors T*r*40 to T*r*79 are sequentially rendered conducting responsively to the removal of the positive potential from their bases in dependence upon the counting action of scanner counters to be described later. The positive potentials are applied to the rectifiers, such as rectifiers *rf*1 and *rf*2 associated with transistor T*r*40, over fixed strappings made between terminals *t*1 and terminals *t*2. The terminals *t*2 comprising 14 terminals in all are arranged in two groups. One of these groups comprises 10 terminals which are connected respectively to the collectors of transistors T*r*80 to T*r*89 constituting output transistors associated with a decimal counter having a cycylic count of ten, whereas the other group of terminals are connected respectively to the collectors of transistors T*r*90 to T*r*93 constituting output transistors of a binary counter having a cyclic count of four. The fixed strappings between the terminals *t*1 and *t*2 serve for combining the counts of the two counters to provide a composite counter with a cyclic count of forty.

Considering now FIGS. 4 to 6 together, the decimal counter referred to above comprises four transistor bistable circuits DC*e*1 to DC*e*4 (shown in outline only) each having a pair of setting and resetting pulse-plus-bias gates GS and GR associated with it. These four bistable circuits would normally provide a count of sixteen but by connecting the collector of the left-hand transistor of the bistable circuit DC*e*4 to the gate GS of the bistable circuit DC*e*2 via a rectifier *rf*26 the count is reduced from sixteen to ten. The binary counter also referred to above comprises two transistor bistable circuits PQ*e* and DU*e* (shown in outline only) having setting and resetting pulse-plus-bias gates GS and GR associated with them. These counters are driven in response to the operation of a free-running transistor multi-vibrator MC (FIG. 6) which feeds pulses to paraphase transistor stages. The first of these stages comprises a transistor T*r*94 having its base connected to the emitter of the left-hand transistor, transistor T*r*105, of the multi-vibrator MC and having its collector connected to the base of a further transistor T*r*95 of the same stage through a capacitor C1 and a resistor R1 connected in parallel relationship. The collector of the transistor T*r*95 is connected in common to a group of rectifiers *rfl*0 to *rfl*9 poled to conduct towards the transistor T*r*95 and individual to leads *l*0 to *l*9 extending to the bases of output transistors T*r*80 to T*r*89 (FIG. 4) of the decimal counter. The collector of the transistor T*r*95 is also connected in common to a further group of rectifiers *rfl*10 to *rfl*13 poled to conduct towards the transistor T*r*95 and individual to leads *l*10 to *l*13 extending to the bases of transistors T*r*90 to T*r*93 (FIG. 4). As will hereinafter be explained, the transistor T*r*95 when it is cut off serves for inhibiting the gating via transistors T*r*80 to T*r*93 of markings applied to the leads *l*0 to *l*13 by the decimal and binary counters until after the counters have been stepped from one position to the next. The stepping of the decimal and binary counters is under the direct control of the other transistor stage of the paraphase transistor stages referred to above and this other stage comprises a transistor T*r*96 having its base connected to the collector of the transistor T*r*95 and having its collector connected to the commoned pulse inputs of the pulse-plus-bias gates GS and GR associated with the bistable transistor circuit PQ*e*. Each of the bistable circuits PQ*e*, DU*e*, DC*e*1 to DC*e*4 has feeder transistors, such as transistors T*r*97 and T*r*98 in the case of bistable circuit PQ*e*, having their bases connected respectively to the collectors of the right-hand and left-hand transistors of the bistable circuits. The collectors of the respective feeder transistors pertaining to the bistable circuits DC*e*1 to DC*e*4 are connected to predetermined combinations of leads in the lead group comprising leads *l*0 to *l*9 through individual rectifiers. For instance, the collector of the right-hand feeder transistor associated with the bistable circuit DC*e*1 is connected in common to the positive poles of rectifiers, collectively designated *rf*DC, (FIG. 5) individual to the leads *l*0, *l*2, *l*4, *l*6 and *l*8 whereas the left-hand feeder transistor of the same bistable circuit has its collector connected in common to rectifiers collectively designated *rf*DC′ (FIG. 5) individual to the leads *l*1, *l*3, *l*5, *l*7 and *l*9. The respective feeder transistors pertaining to the binary counter bistable circuits PQ*e* and DU*e* have their collectors connected via rectifier groups, such as rectifier groups *rf*PQ and *rf*PQ′, to predetermined combinations of the leads *l*10 to *l*13 extending respectively to the bases of the output transistors T*r*90 to T*r*93. It will be observed that the collectors of the right-hand feeder transistors associated with the respective bistable circuits PQ*e*, DC*e*1 to DC*e*4 and DU*e* are further connected to the bases of respective output transistors T*r*99 to T*r*104 so that the latter can be set to a pattern dependent upon the condition of the respective bistable circuits.

At this juncture in the description, it is considered convenient to describe scanning of the start circuits by the electronic scanner SC. For this purpose, let it be assumed that at a particular instant the left-hand transistor (i.e. transistor T*r*105) of the free-running multi-vibrator MC (FIG. 6) is non-conducting. Then the transistor T*r*94 will also be non-conducting since its base is connected to the earth potential applied to the emitter of transistor T*r*105 but transistor T*r*95 will be conducting as a consequence of the negative potential applied to its base from the collector of transistor T*r*94. Thus, earth potential is applied to the base of transistor T*r*96 which is accordingly non-conducting. When the free-running multi-vibrator MC turns over namely by its left-hand transistor T*r*105 changing from its non-conducting state to a conducting state transistor T*r*94 is also caused to conduct. Transistor T*r*95 is accordingly cut-off whereupon transistor T*r*96 conducts. Transistor T*r*95 applies negative potential from its collector to the rectifiers *rfl*0 to *rfl*13 individual to the leads l0 to *l*13 respectively so as to inhibit the gating out of markings applied to the leads *l*0 to *l*13. The positive pulse generated at the collector of transistor T*r*96 consequent upon the latter becoming conducting is fed over a pulse lead *pl*40 to the pulse inputs of the pulse-plus-bias gates GS and GR associated with the bistable circuit PQ*e*. Assuming that the left-hand transistor of bistable circuit PQ*e* is conducting (this being indicated by the upward pointing arrow) and the right-hand transistor of the circiut PQ*e* is cut-off (this being indicated by the downward pointing arrow) then the setting gate GS will be opened by the positive potential applied to its bias input from the collector of the left-hand transistor of the circuit PQ*e* while the resetting gate GR will be closed. Consequently, the positive pulse that is applied to the pulse input of these gates GS and GR over pulse lead *pl*40 will only pass through the gate GS to cause the left-hand transistor of the bistable circuit PQ*e* to be cut-off and the right-hand transistor to conduct. Hence, the conditions of the feeder transistors T*r*97 and T*r*98 will be reversed with a consequential reversal of the polarities of the potentials applied to the rectifier groups *rf*PQ and *rf*PQ' connected respectively to leads *l*11, *l*13 and leads *l*10, *l*12. More specifically, a positive potential is now applied to the rectifier group *rf*PQ' while negative potential is applied to rectifier group *rf*PQ. The conditions of the other bistable circuits of the counters remain unchanged at this time. Thus, as regards leads *l*10 to *l*13 extending to the bases of the conducting output transistors T*r*90 to T*r*93, only lead *l*10 will not have negative potential applied to it from feeder transistors associated with the bistable circuits PQ*e* and DU*e*. Also, as regards the leads *l*0 to *l*9, only lead *l*0 will not have negative potential applied to it from feeder transistors of the bistable circuits DC*e*1 to DC*e*4. However, negative potential is applied to the leads *l*0 to *l*10 at this time through rectifiers *rfl*0 and *rfl*10 so preventing the cutting off of the normally conducting output transistors T*r*80 and T*r*90 pertaining to the leads *l*0 and *l*10. After setting of the counter, the multi-vibrator MC again turns over whereupon the transistors T*r*105 and T*r*94 are cut off and transistor T*r*95 conducts so that the negative inhibiting potential is removed from all of the rectifiers *rfl*0 to *rfl*13 and leads *l*0 to *l*13 with the result that the transistors T*r*80 and T*r*90 are cut off. Upon transistors T*r*80 and T*r*90 being cut off, negative potentials are applied over predetermined fixed strappings between the terminals *t*2 and terminals *t*1 to the rectifiers, such as rectifiers *rf*1 and *rf*2, associated with one of the transistors T*r*40 to T*r*79, whereupon one of these normally non-conducting transistors, such as transistor T*r*40, will be rendered conducting. In conducting, the transistor, such as transistor T*r*40, applies a positive pulse to a pulse lead, such as lead *pl*00, extending to the pulse input of a pulse-plus-bias gate, such as gate G00, in the start circuit *st*00.

It will be recalled that the state of the transistors in the bistable circuit PQ*e* was reversed when the free-running multi-vibrator MC turned over for the first time while the condition of the bistable circuits DU*e* and DC*e*1 to DC*e*4 remained unaltered. However, before the free-running multi-vibrator MC turned over for the second time to bring about the removal of the negative inhibiting potentials applied to leads *l*0 to *l*13 the conditions of the bistable circuits PQ*e*, DU*e*, DC*e*1 to DC*e*4 would be signified by the conditions of transistors T*r*99 to T*r*104 since the bases of these transistors are connected over respective lead *l*14 to *l*19 to the collectors of the right-hand feeder transistors associated with the respective bistable circuits PQ*e*, DC*e*1, DC*e*2, DC*e*3, DC*e*4 and DU*e*. Thus, when the conditions of the feeder transistors associated with the bistable circuit PQ*e* were reversed when the multi-vibrator MC turned over for the first time the transistor T*r*99, which was previously in a non-conducting condition, will be rendered conducting since the feeder transistor T*r*97 was cut off. The transistors T*r*100 to T*r*104, however, remain non-conducting. A marking signifying the condition of the bistable circuits of the scanner SC is extended in common to a group of dial path control circuits (one of which is shown in part in FIG. 7) from the collectors of the transistors T*r*99 to T*r*104 over leads *l*20 to *l*25 for the purpose hereinafter described.

If it is assumed that the start circuit *st*00 is scanned by the first output pulse from the scanner SC on the pulse lead *pl*00 in response to the conduction of transistor T*r*40 then when the multi-vibrator MC next turns over (i.e. for the third time) the condition of the bistable circuit PQ*e* will again be reversed by the positive pulse applied from the collector of transistor T*r*96 (FIG. 6) to the pulse input of open resetting gate GR associated with the bistable circuit PQ*e*, the negative inhibiting potential being applied to the leads *l*0 to *l*13 from the collector of transistor T*r*95. A positive pulse is accordingly fed from the collector of the left-hand transistor of the bistable circuit PQ*e* to the pulse inputs of the setting and resetting gates GS and GR associated with the bistable circuit DC*e*1. The setting gate GS is open due to the positive potential applied to its bias input from the collector of the conducting left-hand transistor of the bistable circuit DC*e*1 while the resetting gate GR is closed. Consequently, the positive pulse from the bistable circuit PQ*e* passes through the gate GS to the base of the left-hand transistor of circuit DC*e*1 to cut-off the latter and render the right-hand transistor of this bistable circuit conducting. The condition of the other bistable circuits DC*e*2, DC*e*3, DC*e*4 and DU*e* remain unchanged. The transistor T*r*99 (FIG. 6) is cut off due to the re-application of positive potential to its base from the collector of the right-hand feeder transistor T*r*97 which is now conducting again, while the transistor T*r*100 conducts due to the application of negative potential to its base from the collector of the right-hand feeder transistor associated with bistable circuit DC*e*1. The transistors T*r*101 to T*r*104, however, remain non-conducting. Thus, a different marking is now extended to the dial path control circuits over the leads *l*20 to *l*25.

The next time (i.e. the fourth time) the multi-vibrator MC turns over a pair of transistors, one from each of the two groups T*r*80 to T*r*89 and T*r*90 to T*r*93, will be rendered non-conducting since the negative inhibiting potential from the transistor T*r*95 will then be removed from the leads *l*0 to *l*13 and two of the leads *l*0 to *l*13 will not be receiving negative potential from feeder transistors associated with the bistable circuits. One of the transistors T*r*40 to T*r*79 will thus be rendered conducting so that a positive scanning pulse from the scanner SC will be fed to the pulse input of the pulse-plus-bias gate of the start circuit next in the scanning cycle of the scanner.

The counting action of the counters proceeds in response to alternate turn-overs of the free-running multi-vibrator MC with odd- and even-numbered start circuits being alternately scanned by the scanner SC. It will be apparent that the state of bistable circuit PQ*e* reverses for each counting step of the counter. The condition of this bistable circuit PQ*e*, as represented by the condition of the transistor T*r*99, serves for indicating to the group of dial path control circuits over lead *l*20 whether the start circuit next to be scanned is an even-numbered start circuit serving the P-lines of a line-group or whether it is an odd-numbered start circuit serving the Q-lines of a line-group. The condition of the bistable circuit DU*e*, as represented by the condition of the transistor T*r*104, serves for indicating to the dial path control circuits over lead *l*25 the particular sub-group of twenty start circuits which contains the start circuit next to be scanned. This will be apparent from the following explanation:

When the bistable circuits DC*e*1 to DC*e*4 are set to the pattern 0001 (where "1" represents the set state of a circuit and "0" represents the reset state) upon receipt of the eighth positive pulse from the bistable circuit PQ*e* the setting gate GS associated with the bistable circuit DC*e*2 which would otherwise be opened due to the conducting condition of the left-hand transistor of the circuit DC*e*2 is closed by a negative potential applied to it from the collector of the left-hand transistor of bistable circuit DC*e*4 via rectifier *rf*26. When the ninth pulse is received by the decimal counter from the bistable circuit PQ*e* the bistable circuits DC*e*1 to DC*e*4 becomes set to the binary pattern 1001 but upon receipt of the tenth pulse the bistable circuit DC*e*1 is reset but the bistable circuit DC*e*2 is prevented from being set in response to the positive pulse from the collector of the left-hand transistor of the circuit DC*e*1 by reason of the negative potential applied to its bias input from bistable circuit DC*e*4. The positive pulse from the circuit DC*e*1 further serves to reset the bistable circuit DC*e*4 through its resetting gate GR so that the bistable circuits DC*e*1 to DC*e*4 are set to the pattern 0000. It will also be seen from the drawings that when the bistable circuit DC*e*4 is reset the positive pulse from the collector of its left-hand transistor is applied to the setting gate GS of the bistable circuit DU*e* to set the latter. This bistable circuit DU*e* is thus set at the end of the first count of ten by the decimal counter and is reset at the end of the second count of ten and so on. Consequently, during one complete scanning cycle of the forty start circuits by the scanner SC the bistable circuit DU*e* will be in its set state during scanning of one sub-group of twenty start circuits (serving one thousand lines) and in its reset state during scanning of the other twenty start circuits (serving the other one thousand lines). It will be seen therefore that the condition of the transistor T*r*104 as representing the condition of the bistable circuit DU*e* serves to effect for identifying to the dial path control circuits which thousand of the two thousand lines served by the start circuit group includes the particular line sub-group associated with the start circuit next to be scanned.

As mentioned above, the two start circuit sub-groups each serve one thousand lines and the particular thousand lines containing the line sub-group served by the start circuit next to be scanned is identified to the dial path control circuits. Assuming for example that these start circuit sub-groups serve respectively lines having the numbers 0000 to 0999 and 1000 to 1999 then one or other of these groups of a thousand lines which is served by the sub-group containing the next start circuit to be scanned will be identified to the dial path control circuits. Each of these thousands lines contains lines having hundred digit values 0 to 9 so that the decimal counter comprising the bistable circuits DC*e*1 to DC*e*4 can be employed for identifying the hundred digit values of lines served by the next start circuit to be scanned to the dial path control circuits. These hundred digit values are identified over leads *l*21 to *l*24 extending from the collectors of transistors T*r*100 to T*r*103 which are set to a pattern determined by the condition of the bistable circuits DC*e*1 to DC*e*4.

Referring now to FIG. 7 of the drawings, there is shown in part one of the dial path control circuits of the group of dial path control circuits serving the start circuit group ST (FIG. 3). The dial path control circuit comprises a store STO constituted by six bistable circuits STO*e*1 to STO*e*6. The collectors of the normally non-conducting left-hand transistors of these bistable circuits (as indicated by the downward pointing arrows) are connected to the collectors of respective normally non-conducting gating transistors T*r*106 to T*r*111 having their bases connected respectively to the leads *l*20 to *l*25 extending into the dial path control circuit from the electronic scanner SC. To the right of the store STO is shown a comparator COM comprising six transistor comparator elements COM*e*1 to COM*e*6 associated respectively with the storage circuits STO*e*1 to STO*e*6. These comparator elements, such as element COM*e*1, each comprise two normally non-conducting feeder transistors, such as transistors T*r*112 and T*r*113, having their bases connected to the collectors of the right-hand transistors of the associated storage bistable circuits, such as circuit STO*e*1, and also to the leads *l*20 to *l*25. The collectors of the transistors of each comparator element, such as transistors T*r*112 and T*r*113, are respectively connected to the emitters of two further transistors, such as transistors T*r*114 and T*r*115, having their collectors interconnected and having their bases cross-coupled to the collectors of the transistors T*r*113 and T*r*112, respectively. Each of these comparator elements, such as element COM*e*1 serves for comparing the polarity of the potential on one of the leads, such as the lead *l*20, with that at the collector of the right-hand transistor of one of the storage bistable circuits, such as storage bistable circuit STO*e*1. If the polarity of the potentials is the same then the condition of the feeder transistors of the comparator element, such as transistors T*r*112 and T*r*113, will also be the same and both the further transistors of the same element, such as transistors T*r*114 and T*r*115, will be non-conducting. However, if the polarity of potentials is different then the condition of the feeder transistors, such as transistors T*r*112 and T*r*113, will be different and one or other of the transistors T*r*114 and T*r*115 will conduct as a consequence of which positive potential will be applied to the collectors of these transistors. It will be seen that the collectors of the last-mentioned transistors of the comparator transistor circuit elements COM*e*1 to COM*e*6 are connected in common to the base of a normally-conducting transistor T*r*116. Consequently, this transistor T*r*116 which normally applies earth potential to the pulse highway PH (FIG. 6) over a lead *l*26 would be cut off thereby removing the positive potential from the lead *l*26 if any of the transistors, such as transistors T*r*114 and T*r*115, in the comparator elements COM*e*1 to COM*e*6 conducts.

Also connected to the pulse highway PH over a pulse lead *pl*41 is the pulse input of a pulse-plus-bias gate GB having its pulse output connected to the base of a normally-conducting transistor T*r*117, the collector of which is connected to the base of a further transistor T*r*118 which is accordingly non-conducting. For controlling the state of the gate GB, its bias input is connected to the collector of a transistor T*r*119 which is shown as being cut-off due to a positive potential applied to its base from a seize terminal *s*1, but as will hereinafter be apparent the transistor T*r*119 may be conducting if the dial path control circuit shown has been allotted by an allotter (FIGS. 8 and 9) to deal with the call. In this eventuality, which will be assumed later, the gate GB will be opened by the positive potential applied to its bias input from the transistor T*r*119. The collector of the normally non-conducting transistor T*r*118 is connected to the emitters of the transistors T*r*106 to T*r*111 as well as to the pulse input of a permanently opened setting gate GS associated with a busy/free bistable circuit BF*e*. The collector of the right-hand transistor of the bistable circuit BF*e* is directly connected to a busy/free test terminal *s*2. At the bottom of FIG. 7, there are shown three sets of normally non-conducting transistors comprising transistor T*r*120 having its base connected to the collector of the right-hand transistor of storage bistable circuit STO*e*1, transistors T*r*121 to T*r*124 having their bases connected to the collectors of the right-hand transistors of the storage bistable circuits STO*e*2 to STO*e*5 and transistors T*r*125 to T*r*127 of which the transistor T*r*125 has its base connected to the collector of the right-hand transistor of the storage bistable circuit STO*e*6.

The transistors T*r*126 to T*r*128 have bases connected to potentials via fixed strappings, whereby the transistors T*r*126 to T*r*128 can be operated to a pattern which is unique for the particular dial path control circuit group containing the dial path control circuit illustrated and which in conjunction with the condition or state of the other transistor T*r*125 included in the same set of transistors can identify to a line location identifier LI (FIG. 1) the particular thousands digit value of a calling line.

The transistors T*r*121 to T*r*124 can be set to a pattern which identifies to the line location identifier LI (FIG. 1) the hundreds digit value of a calling line, while the condition of the transistor T*r*120 can serve for identifying to the line location identifier whether the calling line is a P-line or a Q-line. These various identities will be indicated to the line location identifier from the collectors of the several sets of transistors.

At this point it is convenient to revert to FIG. 6 of the drawings which shows the start signal inhibit circuit PH. This comprises a transistor T*r*129 which is normally cut-off due to positive potential applied to its base from the normally conducting transistor Tr116 (FIG. 7). To the base of this transistor T*r*129 is connected the collector of a further transistor T*r*130 which is normally conducting, but which can be rendered non-conducting by a positive start pulse received over the start pulse lead *spl* extending to the commoned pulse outputs of the start circuit gates, such as gate G00. Should the start pulse be one in respect of which no dial path control circuit has already responded, the positive potential applied to the base of transistor T*r*129 will be removed, thereby allowing this transistor to repeat the start pulse over the lead *pl*41 to the allocated dial path control circuit, however, should the start pulse be one in respect of which a dial path control circuit has already responded, then the positive potential on the base of transistor T*r*129 will not be removed and this transistor will be inhibited from passing the start pulse into the allocated dial path control circuit.

Referring now to FIG. 8, this shows a dial path control circuit allotter which allocates a free dial path control circuit, such as circuit DPC, from the group of dial path control circuits to handle the next call. The dial path control circuit allotter comprises three bistable circuits AL*e*1 to AL*e*3 interconnected to provide a natural count of eight, there being a corresponding number of dial path control circuits in the dial path control circuit group. Pulses are fed from a free-running multi-vibrator MX to a paraphase transistor circuit having two stages, one of which includes transistors T*r*131 and T*r*132, while the other comprises a transistor T*r*133. The transistor T*r*132 has its collector connected in common to a group of rectifiers *rf*X poled to conduct towards transistor T*r*132 and connected respectively to leads *l*27 to *l*34. Also connected to predetermined combinations of these leads *l*27 to *l*34 via groups of rectifiers, such as rectifier groups *rf*AL and *rf*AL′, are the collectors of the left- and right-hand transistors of the bistable circuits AL*e*1 to AL*e*3. The leads *l*27 to *l*34 are respectively connected to the bases of normally non-conducting transistors T*r*134 to T*r*141. Connected to the collectors of each of these transistors T*r*134 to T*r*141 are the collectors of further transistors T*r*142 to T*r*149 having their bases connected to busy-free terminals, such as terminal *s*2, of the respective dial path control circuits of the dial path control circuit group. The collectors of these transistors, such as transistor T*r*142, are connected to seize terminals, such as terminal *s*1, of the respective dial path control circuits, as well as being connected through rectifiers, such as rectifier *rf*100, to the base of a transistor T*r*150 having its collector connected to the collector of the transistor T*r*131.

The dial path allotter counter constituted by the bistable circuits AL*e*1 to AL*e*3 is driven by positive pulses derived from the collector of transistor T*r*133 and fed to the gates GS and GR of circuit AL*e*1 in response to alternate turn-overs of the free-running multi-vibrator MX. Following each counting step of the allotter, during which negative potential is applied from the collector of the non-conducting transistor T*r*132 to the leads *l*27 to *l*34 through the rectifiers *rf*X to inhibit the gating out of a marking on these leads by the transistors T*r*134 to T*r*141, this negative inhibiting potential is removed from the leads *l*27 to *l*34 so that one of the transistors T*r*134 to T*r*141, namely that transistor not having negative potential applied to its base from the bistable circuits AL*e*1 to AL*e*3, will be cut-off. Assuming that transistor T*r*134 is cut-off, then if transistor T*r*142 is also cut-off by positive potential applied to its base, thereby signifying that the dial path control circuit shown in part in FIG. 7 is free, negative potential will be applied from the collector of transistor T*r*134 to the seize terminal *s*1 and thence to the base of transistor T*r*119 in the dial path control circuit (FIG. 7) to render this transistor conducting and thus open the gate GB by the application of positive potential to its bias input. At the same time negative potential is applied from the collector of transistor T*r*134 via rectifier *rf*100 to the base of transistor T*r*150 which is accordingly rendered conducting and so as to maintain the transistor T*r*132 in a non-conducting condition. This serves to prevent further pulses from being fed to the counter bistables AL*e*1 to AL*e*3 from the collector of transistor T*r*133 in response to the operation of the multi-vibrator MX, since the latter transistor is held conducting. Thus, the allotter is arrested on the free dial path control circuit.

As mentioned above the negative potential applied to the seize terminal *s*1 of the free dial path control circuit will cause the transistor Tr119 (FIG. 7) to conduct, thereby opening the gate GB, but the busy/free bistable circuit BF*e* will not turn over to apply a negative potential to the base of transistor T*r*142 until the seized dial path control circuit is actually taken into use. When it is taken into use, the conduction of transistor T*r*142 causes a positive pulse to be applied to the rectifier *rf*100 from the collector of transistor T*r*142 as a consequence of which the negative potential is removed from the base of transistor T*r*150 to cause this latter transistor to cut-off. In so doing, the positive potential holding the transistor T*r*132 in a non-conducting condition and thereby maintaining the transistor T*r*133 conducting is removed so that the allotter counter can step on to search for the next free dial path control circuit in the dial path control circuit group in readiness for dealing with the next call. It was assumed above that the dial path control circuit shown in part in FIG. 7 was free, but if this circuit had been busy transistor T*r*142 would have been in a conducting condition by reason of the negative potential applied to its base from circuit BF*e* and consequently the cutting off of transistor T*r*134 by the allotter counter would have been ineffective to stop the allotter due to positive potential applied to the positive pole of rectifier *rf*100 from the collector of transistor T*r*142. Consequently, the allotter would drive on and test the next dial path control circuit of the relevant group.

Having now described in detail FIGS. 3 to 8 of the drawings, the operation of the electronic scanner SC to find a calling line served by one of the start circuits *st*00 to *st*39 of the start circuit group ST (FIG. 3) will now be described. From the foregoing description, it will be remembered that the electronic scanner SC applies positive scanning pulses in turn over the pulse leads *pl*00 to *pl*39 to the pulse inputs of pulse-plus-bias gates, such as gate G00, in the start circuits *st*00 to *st*39. When a call is initiated on one of the lines served by the start circuit group ST negative potential is applied to the relevant start lead, such as start lead *sl*00, extending to the appropriate start circuit, such as start circuit *st*00. This negative potential causes the transistor, such as transistor T*r*00, in the relevant start circuit to conduct, thereby applying positive potential to the bias input of its appertaining gate, such as gate G00, which is consequently opened. Thus, it will be seen that a positive pulse applied from the electronic scanner SC to the pulse input of the opened pulse-plus-bias gate of the start circuit serving the calling line will pass through this gate on to the start pulse lend *spl*. This positive pulse applied to the start pulse lead *spl* is passed to the start signal inhibit circuit PH (FIG. 6) where it cuts off normally conducting transistor T*r*130.

It will be remembered that just prior to the scanning of a start circuit by the electronic scanner SC, a marking representing the next start circuit to be scanned in the scanning cycle and corresponding to certain identities concerning the lines served by this start circuit is extended to the dial path control circuits. Assuming that the identity of the start circuit has not already been stored in the storage circuits, such as stores STO*e*1 to STO*e*6 of a dial path control circuit, then the comparator COM of a free dial path control circuit which has already been allocated to the next call by the allotter AL in the manner described above will cause the transistor T*r*116 to be cut-off by the application of positive potential from one or more of the transistors, such as transistors T*r*114 and T*r*115, in the comparator elements COM*e*1 and COM*e*6. In cutting off, the transistor T*r*116 removes the positive potential applied to the base of transistor T*r*129 in the inhibit circuit PH. Thus, when transistor T*r*130 is cut-off by the positive pulse applied to its base over the lead *spl* transistor T*r*129 can conduct. In conducting, transistor T*r*129 applies a positive pulse to the pulse input of the pulse-plus-bias gate GB (FIG. 7) over pulse lead *pl*41.

From the foregoing description of FIG. 8 of the drawings, it will be recalled that the dial path control circuit allotter AL when it finds a free dial path control circuit extends negative potential to the seize terminal *s*1 whereupon transistor T*r*119 conducts and in so doing it applies earth potential to the bias input of the gate GB which is accordingly opened. Thus, it will be seen that the positive pulse applied to the pulse lead *pl*41 will pass through the gate GB to render transistor T*r*117 nonconducting and this transistor in turn renders transistor T*r*118 conducting. When transistor T*r*118 conducts positive potential is applied to the pulse input of the permanently open gate of the busy/free bistable circuit BF*e* (FIG. 7) which turns over so as to apply negative potential from the collector of its non-conducting right-hand transistor to the base of transistor T*r*142 in the allotter AL to render this transistor conducting and thereby apply positive potential to the rectifier *rf*100 so as to busy this dial path control circuit by causing the allotter to drive on to the next free dial path control circuit. Positive potential is also applied in common to the emitters of transistors T*r*106 to T*r*111 to prime these transistors associated with the respective storage bistable circuits STO*e*1 to STO*e*6 in the dial path control circuit. Markings representing the calling start circuit and thus identifying whether the calling line is a P-line or a Q-line, identifying one or other of two thousands digit values of the calling line, and identifying the hundreds digit value of the calling line have already been applied to the leads *l*20 to*l*25 from the transistors T*r*99 to T*r*104 and it will be remembered that the comparator COM interrogated these leads *l*20 to *l*25 to ascertain whether the markings just above referred to had already been stored in the store STO prior to scanning the calling start circuit. Upon the transistors T*r*106 to T*r*111 being primed one or more of these transistors will be rendered conducting so as to set the associated storage bistable circuit(s). Thus, the storage bisable circuits will be set to a pattern dependent on the markings applied to the leads *l*20 to *l*25. Markings corresponding to the conditions of the storage bistable circuits STO*e*1 to STO*e*6 are applied to the bases of transistors T*r*120 to T*r*125. More specifically, a marking indicating the condition of storage bistable circuit STO*e*1 is applied to the base of transistor T*r*120; a marking indicating the condition of storage bistable circuits STO*e*2 to STO*e*5 is appplied to the base of transistors T*r*121 to T*r*124; and a marking indicating the condition of storage bistable circuit STO*e*6 is applied to the base of transistor T*r*125. As previously described with reference to FIG. 7 the marking applied to the base of transistor T*r*125 together with a marking applied to the bases of transistors T*r*126 to T*r*128 over fixed strappings serve for identifying the particular thousands digit value of the calling line's number.

From the foregoing description of FIG. 1 of the drawings, it will be recalled that the dial path control circuits can be coupled to the line location identifier LI under the control of the register scanner which serves for coupling dial path control circuits and registers to the line location identifier. Thus, the dial path control circuit which has recorded in it information concerning the calling line will allow itself to be coupled to the line location identifier when it is next afforded the opportunity to do so during the scanning cycle. The dial path control circuit is coupled to the line location identifier in the same way as a register is coupled to the latter in U.S. application Serial No. 122,137, but since the calling line yet requires a register to be coupled to it for dialling special markings will need to be applied to the called line side of the line location identifier to indicate to it that a register is required and not a route through the exchange for setting up the call. Upon coupling of the dial path control circuit to the line location identifier potentials applied from the line location identifier to the collectors of the transistors T*r*120 to T*r*128 cause those transistors having negative potentials applied to their bases to conduct. Thus, the conditions of the storage bistable circuits STO*e*1 to STO*e*6 together with the fixed strappings are identified to the line location identifier by these transistors. In particular, the condition of storage bistable circuit STO*e*1 which identifies whether the calling line is a P-line or a Q-line is identified to the calling line identifier by the condition of the transistor T*r*120; the conditions of the bistable circuits STO*e* to STO*e*5 are signified to the calling line identifier by the operating pattern of transistors T*r*121 to T*r*124 thereby identifying the hundreds digit value of the calling line; and the condition of storage bistable circuit STO*e*6 and the nature of the strappings are signified to the line location identifier over transistors T*r*125 to T*r*128 whereby the particular thousands digit value of the calling line is identified to the line location identifier. Hence, the line location identifier will have transmitted to it at this time sufficient information concerning the identity of the calling line to enable a register group and a free line connector of the line-group containing the calling line to be allocated as previously described with reference to FIG. 1 for dealing with the call. The particular register group chosen on the basis that this group is carrying the least incoming dialling traffic is identified to the dial path control circuit and is recorded by the elements of a bistable store. The identity of the line-group containing the calling line and the identity of a particular free line connector through which access can be had to the calling line and which was selected by a register route selector are also identified to the dial path control circuit and recorded by the elements of further bistable stores in the dial path control circuit. That part of the dial path control circuit (not shown) which includes the bistable stores for recording the various identities passed to it may be similar to the calling line section of the local controller described in U.S. application Serial No. 122,137, that is to say it has a four element bistable store for recording the register group, this store corresponding to the store for recording the chosen transmission bridge link group in the local controller, a seven element bistable store for recording the identity of the line connector group serving the calling line, and a three element bistable store for recording the identity of the chosen line connector of this line connector group. In addition the dial path control circuit also includes a register coupler switch for coupling the dial path control circuit to a register, this switch corresponding to the transmission bridge link coupler switch of the local controller referred to above.

A marking corresponding to the register group to be used is applied from the store recording the register group identity to a group of bank outlets of the coupler switch to which the registers of the group are connected. The coupler switch is caused to search the particular register group which has been allocated to handle the call for a free register which will have a dial path group connector associated with it, such as DPG/C in FIG. 1. Under the control of a sequence control circuit in the dial path control circuit and the recorded identities the dial path group connector will be driven until it reaches the recorded line connector group and thereafter it will be driven until it reaches the particular outlet to which the line connector whose identity is recorded in the dial path control circuit is connected, whereupon the drive circuit for the dial path group connector is interrupted. Thereafter the line connector is caused to search for the calling line, and as it searches over its bank outlets for the calling line, impulses are reverted from its driving coils through the set dial path group connector to the register so as to identify to the register the tens and units digit values of the calling line's number. When the line connector tests into the calling line it completes a connection between the calling line and the register through the set dial path group connector and the dial path control circuit is then released for dealing with a further call. The register returns dial tone to the calling line whereupon the calling subscriber may proceed to dial the called line's identity into the register. When dialling has been completed the register knows the calling line's number having had identified to it the identity of the calling line-group and the tens and units digit values of the calling line. It also knows the called line's identity so that the connection between the calling line and the register can now be cleared down and the call established through the exchange over a route chosen on the basis of the traffic conditions existing in the various sections of the exchange. Thus, the register can now allow itself to be coupled to the line location identifier when it is next afforded the chance of doing this during the scanning cycle of the combined register/dial path control circuit scanner.

When it couples itself to the line location identifier the information stored in the register is passed to the line location identifier in the form of markings applied to groups of leads pertaining respectively to the calling and called lines. The choice of a route through one of the exchange sections and the setting up of the call will thereafter proceed in the manner fully described in U.S. application Serial No. 122,137. If line connectors, such as line connector L/C in FIG. 1, have access only to dial path group connectors then the call, if it is successfully completed, will be established through a line connector different from that through which the calling line was initially coupled to the register. However, economies in line connectors or a better grade of service may be achieved by affording access through line connectors both to dial path group connectors and group connectors for establishing calls through the exchange. In the latter case therefore it is possible for a call to be set up through the line connector that was initially taken into use for establishing the dial path to the register, if this line connector is chosen by the route selectors for setting up the calling side of the call connection.

In order to prevent subscribers from dialling into registers under congestion conditions (i.e. when the conversational trafic is high) it may be arranged that the coupling of calling lines to registers is prevented if the register route selectors indicate that less than a predetermined number of line connectors are free. In this way the repeated dialling by calling subscribers into registers which fail under congestion conditions to establish the calls is avoided.

It will be apparent that a variety of modifications may be made to the particular circuitry described with reference to the drawings for carrying the invention into effect, without departing from the scope of this invention. For instance, it is contemplated that crossbar or relay switching means may be used instead of motor uniselector switches for coupling dial path control circuits to registers. Also, all the lines connected to the exchange may be scanned electronically in which case the calling line's complete identity can be achieved thereby avoiding the necessity for line connectors to search for calling lines.

What I claim is:

1. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections said switching equipment providing a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and similarly the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, and control circuit arrangements and register equipment to which a calling line of a line group served by one of said groups of line connectors can be coupled under control of said control circuit arrangements through a line connector of said line connector group and through a group connector having access to and from the line connector, said control circuit arrangements permitting the subsequent establishment of a communication path between the call lines through a group connector different from that through which the calling line was initially coupled to said register equipment.

2. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections, said switching equipment providing a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and similarly the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, control circuit arrangements and register equipment to which a calling line of a line group served by one of said groups of line connectors can be coupled under control of said control circuit arrangements through a line connector of said line connector group and through a group connector having access to and from the line connector, said control circuit arrangements permitting the subsequent establishment of a communication path between the call lines through a group connector different from that through which the calling line was initially coupled to said register equipment and a line connector which can be different from that through which the calling line was initially coupled to said register equipment.

3. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections said switching equipment providing a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and similarly the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of the line connectors, groups of group connectors to and from which said line connectors are afforded access, control circuit arrangements including dial path group connectors and register equipment by which line connectors of said line connector groups are accessible to and from said dial path group connectors for coupling the line connectors to said register equipment as well as being afforded access to and from communication path group connectors through which communication paths can be established, said control circuit arrangements having means for causing a calling line of a line group served by one of the line connector groups to be coupled to said register equipment through a line connector of the line connector group and through a dial path group connector having access to and from said line connector, and said control circuit arrangements having further means for subsequently establishing a communication path between the call lines in accordance with the operation of said section selecting arrangement and over a communication path group connector and a line connector which can be different from that through which the calling line was initially coupled to the register equipment.

4. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections said switching equipment providing a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and similarly the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, and control circuit arrangements including dial path group connector and register equipment by which each of the line connectors of the line connector groups is afforded access to and from said dial path group connector for coupling said line connector and a line served thereby to said register equipment as well as being afforded access to and from a communication path group connector, said control circuit arrangements having means for causing a calling line of one of said line groups served by a line connector group to be coupled to register equipment through a line connector of the line connector group and through a dial path group connector having access to and from said line connector, and said control circuit arrangements having further means for subsequently establishing a communication path between the calling and called lines through one of the communication path connectors and a line connector which can be different from that line connector through which the calling line was initially coupled to said register equipment, said register equipment comprising a plurality of registers divided into groups pertaining to the respective exchange sections and register selector equipment means for selecting a register group in accordance with the incoming traffic conditions prevailing in the respective register groups.

5. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of which sections said switching equipment affording a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and likewise the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, and control circuit arrangements including register equipment and dial path group connector for causing a calling line of a line group served by a line connector group to be coupled to said register equipment through a line connector of the line connector group and through said dial path group connector having access to and from said line connector, said control circuit arrangements having means for subsequently establishing a communication path between the call lines through a communication path group connector, a group of start circuits allocated to said lines on the basis of two start circuits per line group, and said control circuit arrangements comprising further means for ascertaining the identity of a line connector group capable of dealing with said calling line by searching over said start circuits for finding the start circuit serving said calling line and for subsequently causing a free line connector of the appropriate line connector group to search for the calling line and connect it to said register equipment through said dial path group connector.

6. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections said switching equipment affording a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and likewise the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, control circuit arrangements including register equipment and a dial path group connector and means for causing a calling line of one of the line groups served by a line connector group to be coupled to said register equipment through a line connector of said line connector group and through said dial path group connector having access to and from said line connector, said control circuit arrangements having further means for subsequently establishing a communication path between the calling and called lines to be established over a communication path group connector, a group of start circuits connected to said lines, said control circuit arrangements further comprising means for identifying the line connector group capable of dealing with said calling line by searching over said group of start circuits to find the start circuit which serves the calling line and for subsequently causing a free line connector of the appropriate line connector group to search for the calling line to connect it to the register equipment through said dial path group connector, said means for identifying the calling line being responsive to impulses reverted by said line connector through said dial path group connector to the register equipment of said line connector searches for the calling line.

7. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections said switching equipment affording a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and likewise the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, control circuit arrangements including register equipment and a dial path selector group and having means for causing a calling line of a line group served by a line connector group coupled to said register equipment through a line connector of the line connector group and through said dial path group connector having access to and from said line connector, said control circuit arrangements having further means for subsequently establishing a communication path between the calling and called lines through a communication path group connector, a group of start circuits connected to said lines, said control circuit arrangements including additional means for identifying the line connector group capable of dealing with a calling line by ascertaining such line by searching over said group of start circuits to find that start circuit which serves the calling line and subsequently causing a free line connector of the appropriate line connector group to search for said calling line to connect the calling line to the register equipment through a dial path group connector, the location of the calling start circuit serving for determining the particular group of lines containing the calling line.

8. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of which sections said switching equipment affording a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and likewise the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, control circuit arrangements including a group of start circuit provided in respect of the lines of an exchange unit of an exchange section, a group of dial path control circuits pertaining to each start circuit group, an electronic scanner associated individually with each group of start circuits and the pertaining group of dial path control circuits, and an allotter associated with each group of dial path control circuits for allocating a free dial path control circuit to the next call, a plurality of register groups individual to the respective exchange sections, a traffic summator connected to all of said register groups and adapted for summating traffic in the register groups, a section selecting means for selecting an exchange section in accordance with information fed to it from said traffic summator, register route selecting means associated with the respective sections, line identifier means for identifying to said register route selecting means in common the identity of a calling line and for identifying the line connector group and the line connector of said group capable of dealing with the calling line and for extending such information to the dial path control circuit allocated by the allotter to the call, said dial path control circuit comprising means for causing a free register to be selected from the register group identified by the section selecting means for dealing with the call, means for establishing the connection between the selected register and the calling line through a dial path group connector and the line connector identified to the dial path control circuit by the register route selecting means, said dial path group connector including means responsive for releasing said connector once the register has had transmitted to it the identities of the called and calling lines whereby the call is established through a line connector and a communication path group connector.

9. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of which sections said switching equipment affording a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and likewise the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a commuication path between the call lines and for establishing this communication path over the selected path portions and the link which interconnects them, groups of line connectors, groups of group connectors to and from which said line connectors are afforded access, control circuit arrangements including a group of start circuits provided in respect of the lines of each unit of an exchange sections, a group of dial path control circuits pertaining to each start circuit group, an electronic scanner associated individually with each group of start circuits and its pertaining group of dial path control circuits, an allotter associated with each group of dial path control circuits for allocating a free dial path control circuit to the next call, storage elements in each of said dial path control circuits for storing at least partly the identity of a calling line, and comparator elements associated, respectively, with said storage elements for ascertaining whether a stored identity corresponds to the identity of the line next to be scanned by said electronic scanner, a plurality of register groups individual to the exchange sections, a traffic summator connected to all said register groups for summating traffic in the register groups, a section selecting means for selecting the exchange section in dependence upon information fed to its from the traffic summator, register route selecting means associated with the respective sections, line identifier means common to all said exchange sections for identifying to the route selecting means the identity of a calling line and for identifying the line connector group and the particular line connector of said group capable of dealing with the calling line and for passing such information to the dial path control circuit allocated by the allotter to the call and the dial path control circuit causing a free register to be selected from the register group identified by the section selecting means for dealing with the call, a connection connecting the selected register and the calling line through a dial path group connector and the line connector identified to the dial path control circuit by the register route selecting means, said dial path group connector being releasable once the register has had transmitted to it the identities of the called and calling lines by the response of release means whereby the call is established through a line connector and a communication path group connector.

10. In an automatic telecommunications exchange including a plurality of lines connected to said exchange, and comprising switching equipment for the selective establishment of communication paths between said lines, a plurality of sections defined by said switching equipment with there being access to a plurality of sections by each of said lines, a plurality of links, in each of said sections said switching equipment affording a plurality of selectable routes through the section between the lines with access to it and said plurality of links, the routes through each section being separate from and independent of those of the other sections and the sections and links together affording between any two of said lines a plurality of possible communication paths, each communication path having incoming and outgoing portions interconnected by one of said links with the incoming portions of the several paths extending over respective routes in different sections and likewise the outgoing portions of the several paths extending over respective routes in different sections, a section selecting arrangement comprising means operable in response to a call between two lines for ascertaining pertinent conditions in the several sections for selecting from said path portions in accordance with the ascertained conditions an incoming path portion and outgoing path portion for a communication path between the call lines and for establishing this communication path over the selected path portions and the link which interconnects them, groups of line connectors, groups of group connectors to and from which said line connectors are afforded access, control circuit arrangements including a group of start circuits provided in respect of the lines of one of a plurality of units in each exchange section, a group of dial path control circuits pertaining to each start circuit group, an electronic scanner associated individually with each group of start circuits and its pertaining group of dial path control circuits, an allotter associated with each group of dial path control circuits for allocating a free dial path control circuit to the next call, storage elements in each of said dial path control circuits for storing at least partly the identity of a calling line, comparator elements associated respectively with said storage elements for ascertaining whether a stored identity corresponds to the identity of the line next to be scanned by said electronic scanner, a plurality of register groups individual to the exchange sections, a traffic summator connected to all said register groups for summating the traffic in the register groups, a section selecting means for selecting the exchange section in dependence upon information fed to its from the traffic summator, register route selecting means associated with the respective sections, line identifier means common to all said exchange sections for identifying to the register route selecting means the identity of a calling line and for identifying the line connector group and the particular line connector of said group capable of dealing with the calling line and for transmitting such information to the dial path control circuit allocated by the allotter to the call and the dial path control circuit causing a free register to be selected from the register group identified by the section selecting means for dealing with the call, a connection connecting the selected register and the calling line through a dial path group connector and the line connector identified to the dial path control circuit by the register route selecting means and said dial path group connector being releasable by release means responsive when the register has had transmitted to it the identities of the called and calling lines and the call then being established through a line connector and a communication path group connector, said control circuit arrangements also including a start signal inhibit circuit common to all said start circuit groups and including means for inhibiting the transmission from a calling start circuit of a start signal to the dial path control circuits of the appropriate group when the identity of the calling line transmitted to the appropriate group of dial path control circuits by the electronic scanner immediately prior to scanning of the calling line corresponds to an identity already stored in the storage elements of any of the dial path control circuits of said group, and means for extending said start signal to the dial path control circuit allocated to the call to effect seizure of said circuit for storing the identity of the calling line in its storage elements when the aforesaid correspondence does not exist.

References Cited by the Examiner

UNITED STATES PATENTS

| | | | |
|---|---|---|---|
| 2,252,856 | 8/41 | Lubberger | 179—18 |
| 2,535,661 | 12/50 | Adam et al. | 179—18 |

ROBERT H. ROSE, *Primary Examiner.*

WILLIAM C. COPPER, *Examiner.*